United States Patent
Cline et al.

(10) Patent No.: US 8,340,990 B2
(45) Date of Patent: Dec. 25, 2012

(54) LOGISTICS PLANNING IN A BUSINESS ENVIRONMENT

(75) Inventors: Robert L. Cline, Germantown Hills, IL (US); Sarah N. Pick, Naperville, IL (US); William P. Newton, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 969 days.

(21) Appl. No.: 12/219,437

(22) Filed: Jul. 22, 2008

(65) Prior Publication Data

US 2010/0023363 A1    Jan. 28, 2010

(51) Int. Cl.
*G06Q 10/00* (2012.01)

(52) U.S. Cl. .................. 705/7; 705/8; 705/11; 705/7.38; 705/7.34; 705/28

(58) Field of Classification Search .................. 705/7–8, 705/11
See application file for complete search history.

(56) References Cited

U.S. PATENT DOCUMENTS

| | | | |
|---|---|---|---|
| 5,485,369 A | 1/1996 | Nocholls et al. | |
| 5,666,493 A | 9/1997 | Wojcik et al. | |
| 5,712,989 A | 1/1998 | Johnson et al. | |
| 5,835,377 A | 11/1998 | Bush | |
| 5,978,771 A | 11/1999 | Vandivier, III | |
| 5,991,732 A | 11/1999 | Moslares | |
| 6,151,582 A * | 11/2000 | Huang et al. | 705/7.25 |
| 6,202,043 B1 | 3/2001 | Devoino et al. | |
| 6,581,204 B2 | 6/2003 | DeBusk et al. | |
| 6,873,963 B1 | 3/2005 | Westbury et al. | |
| 6,879,962 B1 | 4/2005 | Smith et al. | |
| 7,212,976 B2 * | 5/2007 | Scheer | 705/7.34 |
| 7,218,982 B1 | 5/2007 | Koenig et al. | |
| 7,225,981 B2 * | 6/2007 | Jongebloed | 235/385 |
| 2002/0198808 A1 * | 12/2002 | Myers | 705/35 |
| 2004/0030563 A1 * | 2/2004 | Porcari et al. | 705/1 |
| 2004/0054570 A1 | 3/2004 | Streetman | |
| 2005/0015167 A1 | 1/2005 | Searcy et al. | |
| 2005/0015288 A1 | 1/2005 | Reeves et al. | |
| 2005/0065828 A1 | 3/2005 | Kroswek et al. | |
| 2005/0154653 A1 * | 7/2005 | Jongebloed | 705/28 |
| 2005/0256787 A1 * | 11/2005 | Wadawadigi et al. | 705/28 |
| 2005/0273434 A1 * | 12/2005 | Lubow | 705/59 |
| 2006/0085203 A1 | 4/2006 | Schweickart et al. | |
| 2006/0167741 A1 * | 7/2006 | Erickson et al. | 705/10 |
| 2007/0038323 A1 | 2/2007 | Slocum et al. | |
| 2007/0143134 A1 * | 6/2007 | Eller et al. | 705/1 |
| 2009/0138315 A1 * | 5/2009 | Schroeder | 705/8 |

* cited by examiner

*Primary Examiner* — Vanel Frenel
(74) *Attorney, Agent, or Firm* — Finnegan, Henderson, Farabow, Garrett & Dunner LLP

(57) ABSTRACT

A method for supply chain design may include identifying nodes, links connecting the nodes, and replenishment strategies for moving materials along the links, in a supply chain. The method may also include determining a value indicative of the complexity of the supply chain based on a characteristic of the nodes, links, and replenishment strategies. The method may also include identifying whether core competencies of the nodes are underutilized. The method may also include reducing the complexity of the supply chain to increase utilization of the core competencies of the nodes.

19 Claims, 3 Drawing Sheets

LOGISTICS PLANNING IN A BUSINESS ENVIRONMENT

TECHNICAL FIELD

The present disclosure relates generally to business planning, and relates more particularly to logistics planning in a business environment.

BACKGROUND

A supply chain may include a system composed of business organizations, personnel, technology, activities, information, and resources, involved in moving materials from one point to another. A typical supply chain may include nodes, as well as links connecting those nodes. The nodes may represent physical locations that materials may pass through while flowing through the supply chain. The links may represent transportation channels used to deliver the materials between the nodes.

Numerous transactions may be performed on the materials during their movements through the nodes and links of the supply chain. Examples of transactions may include scanning, storing, picking, and loading. As the number of transactions increases, the supply chain may become increasingly inefficient. In order to minimize inefficiencies, and thus, keep down costs associated with moving the materials, and keep the materials moving through the supply chain quickly, businesses may try to design and implement efficient pathways for moving materials through the supply chain.

At least one system has been developed for planning routes for moving materials through a supply chain. For example, U.S. Pat. No. 7,212,976 to Scheer ("Scheer") discloses using an electronic system and method for selecting a fulfillment plan for moving items within a supply chain. In Scheer, to select the fulfillment plan, a list of alternative fulfillment plans for moving an item within the supply chain is constructed. The constructed alternative fulfillment plans are evaluated against a predetermined criteria, and the constructed alternative fulfillment plan that most closely meets the predetermined criteria is selected for implementation to position the item within the supply chain for use in meeting the order. When constructing the list of alternative fulfillment plans, one or more of the following is considered: a customer specified point of delivery; a customer specified delivery date; various combinations of sourcing points within the supply chain; customer specified consolidation requirements; activity costs; inventory age; and a customer specified price quote. However, Scheer's system and method may not take into account other factors that could help in reducing the inefficiencies in the supply chain. Moreover, Scheer's system and method focus mainly on selecting a fulfillment plan for moving material through the supply chain when, in some instances, it may be beneficial to change the design of the supply chain itself.

The system and method of the present disclosure is directed towards overcoming one or more of the constraints set forth above.

SUMMARY

In one aspect, the presently disclosed embodiments may be directed to a system for supply chain design. The system may include a supply chain network. The supply chain network may be operable to identify nodes, links connecting the nodes, and replenishment strategies for moving materials along the links, in a supply chain. The supply chain network may also be operable to determine whether the supply chain has inefficiencies based on a characteristic of the nodes, links, and replenishment strategies. The supply chain network may also be operable to reduce the inefficiencies by reducing an underutilization of core competencies of the nodes.

In another aspect, the presently disclosed embodiments may be directed to a computer readable medium. The computer readable medium may include instructions for identifying nodes, links connecting the nodes, and replenishment strategies for moving materials along the links, in a supply chain. The computer readable medium may also include instructions for identifying tasks performed at the nodes at a target level of performance. The computer readable medium may also include instructions for modifying the supply chain so that resources used by the supply chain are used to perform the identified tasks.

In another aspect, the presently disclosed embodiments may be directed to a method for supply chain design. The method may include identifying nodes, links connecting the nodes, and replenishment strategies for moving materials along the links, in a supply chain. The method may also include determining a value indicative of the complexity of the supply chain based on a characteristic of the nodes, links, and replenishment strategies. The method may also include identifying whether core competencies of the nodes are underutilized. The method may also include increasing utilization of the core competencies of the nodes to reduce the complexity of the supply chain.

DETAILED DESCRIPTION

Figure 1:
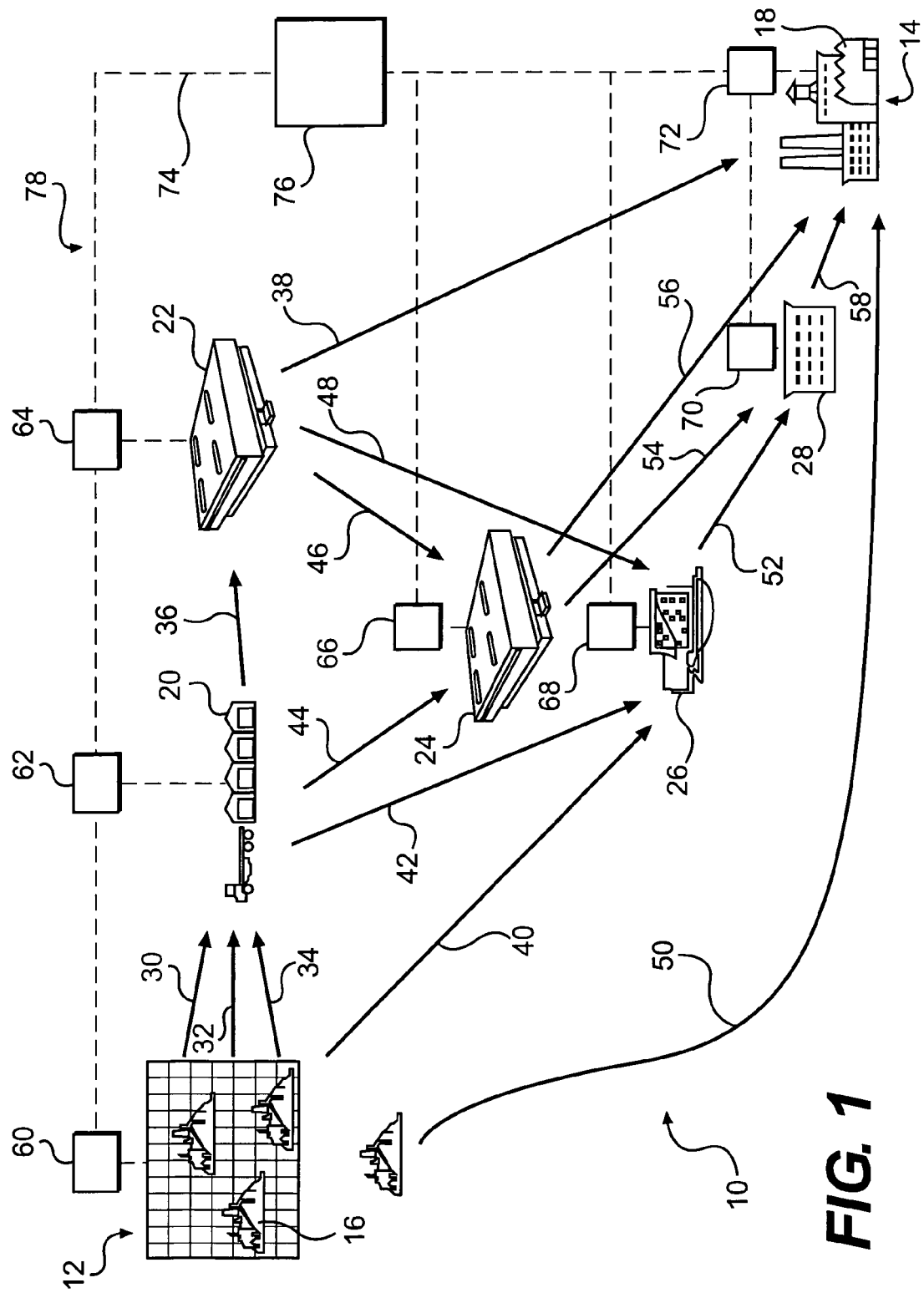
FIG. 1 is a schematic illustration of a supply chain, according to an exemplary feature of the present disclosure.

A supply chain 10, shown in FIG. 1, may be used by a business enterprise to move materials from an upstream node, such as a point of receipt 12, to a downstream node, such as a point of use 14. Point of receipt 12 may include a supplier 16 of materials, such as raw materials used in the manufacture of products. Point of use 14 may include a manufacturing facility 18, where the materials may be used to manufacture products for customers. Supply chain 10 may also include intermediate nodes 20-28 located between point of receipt 12 and point of use 14. Intermediate nodes 20-28 may include a cross dock 20, an inbound logistics center ("ILC") 22, a logistics service center ("LSC") 24, a third party supplier 26, and a manufacturing storage facility 28. Nodes 16-28 may be physically located in different geographic locations, and thus, transportation channels may be provided for moving materials between nodes 16-28. The transportation channels are represented by links 30-58. It should be understood that the arrangement of links 30-58 and nodes 16-28 shown in FIG. 1 are exemplary only, and it is contemplated that the different links, nodes, or combinations thereof, may be included.

Cross dock 20 may include a facility that receives materials from inbound carriers. Personnel and equipment at cross dock 20 may process the incoming materials. Processing may include, for example, organizing the materials into staging areas, sorting the materials, consolidating the materials, preparing outgoing shipments of the materials, assigning destinations for the outgoing shipments, and loading the materials onto outbound carriers for transportation to the assigned destinations. The above-listed processes may be performed at cross dock 20 with minimal or no warehousing, thus helping to streamline the flow of materials from point of receipt 12 to point of use 14.

ILC 22 may provide a hub where long-distance carriers can connect with local carriers. Long-distance carriers may deliver materials to ILC 22. Personnel and equipment at ILC 22 may receive and process the materials. The processes performed at ILC 22 may include the processes described with respect to cross dock 20. Additionally or alternatively, materials may be broken down into shipments for local carriers. The outbound local carriers may then deliver the shipments to their assigned destinations.

LSC 24 may include a facility where materials from inbound carriers are received and processed. Personnel and equipment at LSC 24 may process the materials by performing the processes described above with respect to cross dock 20 and ILC 22. Additionally or alternatively, at ILC 24, parts sequencing, quality inspection, just-in-time and line-side delivery, inbound material control, inventory management, returnable container management, supply chain analysis and design, and/or any other suitable logistics processes may be performed. LSC 24 may employ a warehouse management system and other information technology tools, including, for example, bar-code scanning with radio frequency devices, to improve handling efficiency, allow accurate material visibility, and reduce costs. After processing, outbound carriers may be loaded with the materials for delivery to their assigned destinations.

Third party supplier 26 may include people or organizations, external to the business enterprise, that supply additional resources or services the business enterprise may use to move materials through supply chain 10. For example, third party supplier 26 may supply parts, storage space, expertise, and/or transportation services. Third party supplier 26 may also perform processes similar to those performed by cross dock 20, ILC 22, and LSC 24.

Manufacturing storage facility 28 may include a facility where materials used for manufacturing products at point of use 14 are received, warehoused, and prepared for shipment. In performing these operations, personnel and equipment at manufacturing storage facility 28 may carry out processes similar to those described above with respect to cross dock 20, ILC 22, and LSC 24. Additionally or alternatively, shipments may be organized for use at point of use 14.

Links 30-58 may be indicative of material flow between nodes 16-28. Links 30-58 may represent the transportation channels used to move materials between nodes 16-28. Transportation channels may include infrastructure (e.g., roadways, waterways, airways, pipelines, and/or any other suitable infrastructure), as well as transportation providers that may operate vehicles for delivering materials (e.g., trucks, trains, planes, ships, and/or any other suitable vehicles).

Computer systems 60-72 may be provided at nodes 16-28 of supply chain 10. Computer systems 60-72 may execute software programs with instructions for performing operations, including, for example, monitoring and planning movements of materials into, through, out of, and between nodes 16-28. Computer systems 60-72 may also include hardware, for example, one or more input devices, operable to provide computer systems 60-72 with input data for the software programs. Examples of input devices include keyboards, optical readers/scanners, radio frequency identification devices, sensors, and/or any other suitable input devices. The input data may include, or may be used to calculate, material movement data, material velocity data, performance data, cost data, financial data, productivity data, quality data, accuracy data, reliability data, production and distribution schedules, demand forecast data, inventory level data, transportation information, operating capacity data, order fulfillment activities data, and/or any other suitable logistics data.

Computer systems 60-72 may be linked by a communications network 74, such as the Internet, a local area network, a wide area network, a workstation peer-to-peer network, a direct link network, a wireless network, and/or any other suitable communications platform. In one embodiment, communications network 74 may link a central computer system 76 with computer systems 60-72. Central computer system 76 may be operable to receive and process data from the other computer systems 60-72. Additionally or alternatively, one or more of computer systems 60-72 may act as a central computer system.

Central computer system 76, computer systems 60-72, communications network 74, and/or personnel and equipment used in supply chain 10, may form a supply chain network 78 for monitoring supply chain 10, recording data, and controlling operations. Data from supply chain network 78 may be accessible to one or more persons involved in operating supply chain 10, or involved in its management or design. These individuals may use the data to gauge the overall performance of supply chain 10, to identify problems, and to take steps to streamline the flow of materials from point of receipt 12 to point of use 14.

One or more material replenishment strategies may be used to move material through supply chain 10. Material replenishment strategies may be implemented using supply chain network 78. For example, if a particular material replenishment strategy is desired for links 30-58, central computer system 76 may be used to instruct computer systems 60-72 to implement or recommend actions so that the materials are received, processed, and/or sent out, according to a schedule that is based on the principles embodied in the material replenishment strategy. Central computer system 76 may also be used to provide instructions for changing a link's material replenishment strategy when such a change is requested. Links 30-58 may have one or more replenishment strategies. For example, a first link may use a first replenishment strategy, while a second link may use a second replenishment strategy. It is also contemplated that a single link may use a first replenishment strategy for moving a first type of material and a second replenishment strategy for moving a second type of material. Further, a single link may use multiple replenishment strategies to move a single type of material.

One material replenishment strategy is ordered specific sequenced delivery ("OSS"). OSS has certain characteristics. For example, in OSS, materials in a shipment may be unique to a shipping order. As such, the materials should usually be delivered in sequence.

Another material replenishment strategy is execution drive demand ("EDD"). With EDD, materials in a shipment may not be specific to a shipping order. Also, materials may be delivered according to a fixed schedule, although the quantity delivered with each shipment may be variable. Further, requests for replenishment of materials may be initiated based on execution signals received from a downstream node.

Another material replenishment strategy is kanban trigger replenishment ("KTR"). With KTR, materials in a shipment may be delivered in predetermined fixed quantities. However, the delivery schedule for the shipments may be variable. Also, there may be a fixed upper limit to the inventory level at nodes that participate in KTR. Further, replenishment of materials may be based on actual consumption of materials at a downstream node.

Another material replenishment strategy is forecast driven demand ("FDD"). FDD may be useful for moving low cost materials, materials having small part sizes, and/or materials for which there may be infrequent demand. With FDD, replenishment of materials may be driven by forecasted material requirements and/or a software based material resource planning system.

Figure 3:
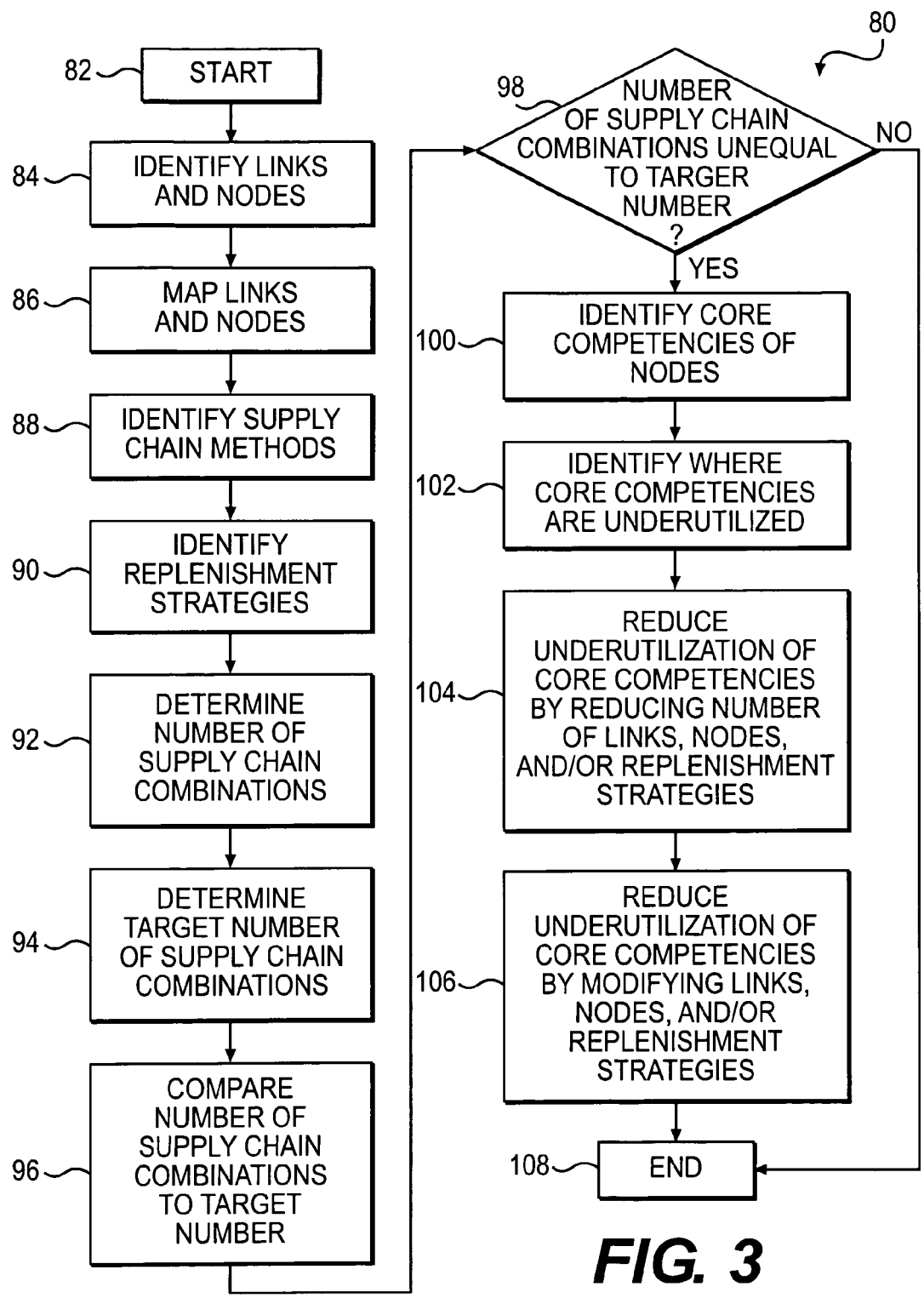
FIG. 3 is a flow diagram of a method, according to an exemplary feature of the present disclosure.

Supply chain network 78 may be used to design or modify supply chain 10. An exemplary embodiment of a method 80 for designing supply chain 10 using supply chain network 78 is shown in FIG. 3. Supply chain network 78, central computer system 76, or computer systems 60-72, may be operable to perform method 80 by following instructions input by one or more users and/or instructions written on a computer readable medium. Method 80 may start (step 82) with monitoring the flow of materials through supply chain 10 to identify links 30-58 and nodes 16-28 (step 84). Supply chain network 78 may generate a map of links 30-58 and nodes 16-28 (step 86), similar to the schematic shown in FIG. 1.

Using the map, and related data, supply chain network 78 may identify one or more supply chain methods in supply chain 10 (step 88). Supply chain methods are unique paths through which materials can flow in supply chain 10. One way that supply chain network 78 may identify supply chain methods is by analyzing material flow through supply chain 10. The analysis may provide a record of links 30-58 and nodes 16-28 through which materials have passed. A total number of supply chain methods for supply chain 10 may equal the total number of different flow paths (combinations of links and nodes) that materials can travel along from point of receipt 12 to point of use 14. For example, in FIG. 1, supplier 16, link 40, third party supplier 26, link 52, manufacturing storage facility 28, link 58, and manufacturing facility 18 may form a supply chain method. Supplier 16, link 32, cross dock 20, link 42, third party supplier 26, link 52, manufacturing storage facility 28, link 58, and manufacturing facility 18 may form a different supply chain method.

Supply chain network 78 may also identify the types of replenishment strategies used in supply chain 10 (step 90) by analyzing when and how material is delivered between nodes 16-28. If the movement of material corresponds to the characteristics of a particular replenishment strategy (e.g., OSS, EDD, KTR, or FDD), then it may be determined that the particular replenishment strategy is the one being used. Additionally or alternatively, the types of replenishment strategies may be preprogrammed data entered into supply chain network 78 using an input device.

Supply chain network 78 may then determine a characteristic of nodes 16-28, links 30-58, and replenishment strategies, such as the number of supply chain combinations they create in supply chain 10 (step 92). The number of supply chain combinations may be determined by multiplying the number of replenishment strategies by the number of supply chain methods. The number of supply chain combinations in supply chain 10 may provide an indication of the complexity of supply chain 10. The greater the number of supply chain combinations, the greater the complexity of supply chain 10, and the more likely it is that supply chain 10 has inefficiencies. Inefficiencies may include, for example, unnecessary or underutilized nodes, links, and/or replenishment strategies. Unnecessary or underutilized elements of supply chain 10 may increase costs associated with transportation, distribution, and storage of materials.

The existence of many supply chain combinations may be caused by the presence of many nodes, links, supply chain methods, and/or replenishment strategies, in supply chain 10. The greater they are in number, the greater the number of steps or transactions required to move materials through supply chain 10. Each of those steps or transactions may consume time and resources. Through the analysis of performance data, cost data, or any other suitable logistics data, and/or through analysis of historical records, a target number, or value indicative thereof, for the number supply chain combinations may be determined (step 94). The number of supply chain combinations may be compared to the target number (step 96) to determine if the number of supply chain combinations is unequal to the target number (step 98).

If the number of supply chain combinations is, for example, excessive (YES), steps may be taken to reduce the number of those inefficiencies. One step may be to identify the core competencies of nodes 16-28 (step 100). If a node is a facility, the core competencies of that node may include those tasks, activities, and/or processes the facility was designed to perform. For example, a core competency of cross dock 20 may include receiving and organizing materials for further transport. A core competency of manufacturing storage facility 28 may be warehousing of materials. The core competencies may also include those tasks, activities, and/or processes that personnel running the facility are adept at performing. For example, a core competency of LSC 24 may be logistics planning. The core competencies may be preprogrammed data entered into supply chain network 78.

Additionally or alternatively, by monitoring the flow of materials through supply chain 10, and the processes performed at nodes 16-28, and by analyzing performance data with the help of supply chain network 78, the tasks, activities, and/or processes, that nodes 16-28 are adept at performing may be identified. Those tasks, activities, and/or processes, may be recognized as the core competencies of nodes 16-28. A node may be adept at performing a task, activity, or process, if the task, activity, or process, can be performed at the node at a target level of performance. It should be understood that performance may be measured in terms of time, quantity, quality, and/or any other suitable performance measure.

Once the core competencies have been identified, the next step may involve identifying where the core competencies are underutilized (step 102). For example, supply chain network 78 may determine that the core competency of LSC 24 includes logistics activities, such as performing parts sequencing, quality inspection, and preparation of materials for delivery. If LSC 24 has the resources to perform more of these activities, but is not using those resources, a recognition is made that LSC 24 has a core competency that is underutilized. Supply chain network 78 may also determine whether activities that fall under the core competency of LSC 24 are being outsourced to other nodes, such as third party supplier 26 or manufacturing storage facility 28. If that is the case, the potential may exist for eliminating inefficiencies in supply chain 10 by using LSC 24 instead of outsourcing.

As another example, it may be determined that the core competency of manufacturing facility 18 is manufacturing, but resources (such as space and manpower) at manufacturing facility 18 are being used for logistics activities. As such, the core competency of manufacturing facility 18, manufacturing, might be underutilized because resources are being used for other activities. Moreover, in some instances, manufacturing space and labor may have higher costs than logistics space and labor, resulting in additional inefficiency.

Supply chain network 78 may reduce the underutilization of core competencies, and/or increase the utilization of core competencies. One way supply chain network 78 may reduce the underutilization of core competencies is by helping to reduce the number of nodes 16-28, links 30-58, and/or replenishment strategies (step 104), present in supply chain 10. For example, if supply chain network 78 determines that the ability of LSC 24 to perform logistics activities (a core competency of LSC 24) is underutilized, and third party supplier 26 has been added to supply chain 10 to perform logistics activities, the underutilization may be reduced by eliminating third party supplier 26 from supply chain 10. Supply chain network 78 may transfer those logistics activities to LSC 24 by re-routing the flow of materials in supply chain 10.

Additionally or alternatively, supply chain network 78 may modify nodes 16-28, links 30-58, and/or replenishment strategies, to increase utilization of core competencies (step 106). For example, if LSC 24 is used to perform manufacturing activities, supply chain network 78 may re-design LSC 24 to perform logistics activities, not manufacturing activities. To carry out the re-design, supply chain network 78 may re-route material through other links and nodes to change the type or quantity of material entering, flowing through, and leaving LSC 24. The re-routing of material may include modifying the type of replenishment strategy employed in one or more of links 30-58 to ensure that each of the remaining nodes receives materials when needed. These steps may make resources available at LSC 24 that otherwise would not have been.

It is also contemplated that supply chain network 78 may re-route material to nodes that are physically closer to one another to reduce transportation costs and travel time. Additionally or alternatively, using supply chain network 78, data received from nodes 16-28 may be compared to determine if technology used at one node is incompatible with technology used at another node. Incompatibility may lead to inefficiencies, including the expenditure of resources to synchronize one form of technology with the other. Standardizing the technologies across supply chain 10 may reduce inefficiency, and thus, underutilization of core competencies. Supply chain network 78 may implement standardization by identifying incompatible technologies in supply chain 10 and assisting in their replacement or modification.

After the above described steps have been performed and/or when the number of supply chain combinations equals the target number, method 80 may end (step 108). It should be understood, however, that method 80 may repeat one or more times while supply chain 10 is operational. It should also be understood that the steps in method 80 are exemplary, and not all of the steps are required. For example, in method 80, steps 92-98 may be omitted, and supply chain network 78 may identify and reduce the underutilization of core competencies without triggering by the number of supply chain combinations.

Figure 2:
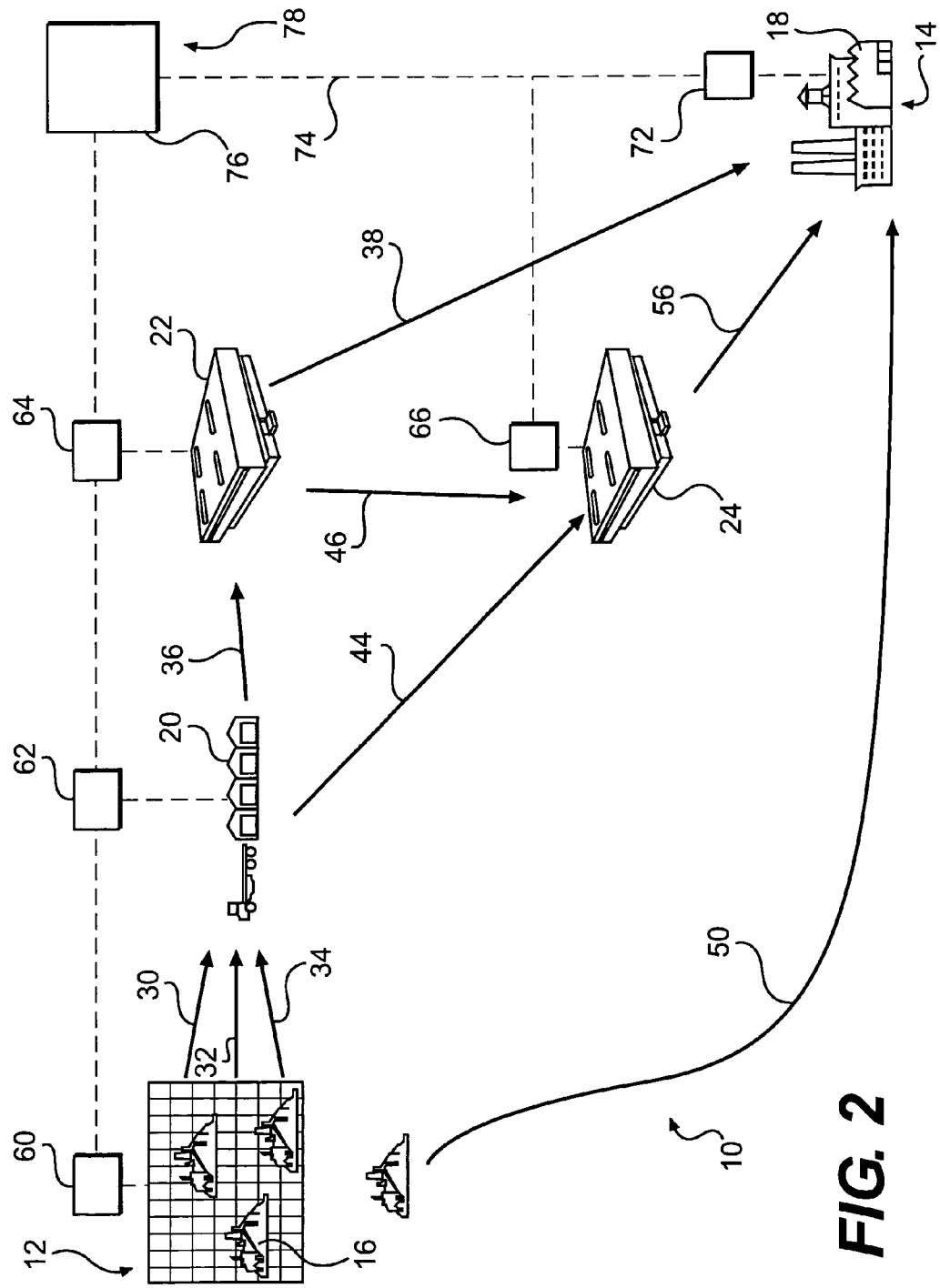
FIG. 2 is a schematic illustration of a supply chain, according to an exemplary feature of the present disclosure.

FIG. 2 shows supply chain 10 of FIG. 1 after method 80 has been performed. In order to arrive at the arrangement shown in FIG. 2, supply chain network 78 was used to determine that an excessive number of supply chain combinations was present in the arrangement shown in FIG. 1, and using steps described in method 80, third party supplier 26 and manufacturing storage facility 28 were eliminated from supply chain 10.

Those skilled in the art will appreciate that all or part of the systems and methods consistent with the present disclosure may be stored on or read from computer-readable media. Computer systems 60-72 and central computer system 76 may execute instructions provided in a computer-readable medium having stored thereon machine executable instructions for performing, among other things, the methods disclosed herein. Exemplary computer readable media may include storage devices, like hard disks, floppy disks, and compact discs; or other forms of computer-readable memory. Furthermore, one skilled in the art will also realize that the processes illustrated in this description may be implemented in a variety of ways and include modules, programs, applications, scripts, processes, threads, or code sections that may all functionally interrelate with each other to provide the functionality described above.

It is also contemplated that at least some of the processes described in the present disclosure may be carried out manually by personnel at nodes 16-28 and/or personnel analyzing supply chain 10. Those manual processes may produce data that can be entered into supply chain network 78 for use in other automated and manual processes.

INDUSTRIAL APPLICABILITY

A supply chain network 78 may have applicability in virtually any type of business, and in particular, those in which a supply chain 10 is used to move materials. Processes and methods consistent with the disclosed description of supply chain network 78 may provide ways to reduce inefficiencies in supply chain 10 and/or utilize underutilized core competencies associated with organizations, people, technology, activities, information, and resources, that make up supply chain 10.

Supply chain network 78, and the processes it performs, may be used to design and/or re-design supply chain 10. By identifying and monitoring links 30-58 and nodes 16-28 in supply chain 10, supply chain network 78 may be used to determine the complexity of supply chain 10 and identify potential areas where the complexity can be reduced. Reducing the complexity of supply chain 10 may result in fewer transactions and resources consumed to move materials through supply chain 10.

Further, supply chain network 78 may be used to identify core competencies of nodes 16-28 in supply chain network, and the level of utilization of those core competencies. By identifying those core competencies, and helping to ensure that they are being utilized, supply chain network 78 can help reduce waste within supply chain 10. The reduction in waste may result in a decrease in inventory levels, transportation costs, and resource consumption. The reduction in waste may also result in increased quality, reliability, cooperation among nodes 16-28, material velocity, and overall profit for a business enterprise.

It will be apparent to those skilled in the art that various modifications and variations can be made in the disclosed systems and methods without departing from the scope of the disclosure. Additionally, other embodiments of the disclosed systems and methods will be apparent to those skilled in the art from consideration of the specification. It is intended that the specification and examples be considered as exemplary only, with a true scope of the disclosure being indicated by the following claims and their equivalents.

What is claimed is:

1. A system for supply chain design, comprising:
   a supply chain network operable to:
      identify nodes, links connecting the nodes, and replenishment strategies for moving materials along the links, in a supply chain;
      determine whether the supply chain has inefficiencies based on a characteristic of the nodes, links, and replenishment strategies; and
      reduce the inefficiencies by reducing an underutilization of core competencies of the nodes.

2. The system of claim 1, wherein the supply chain network is operable to determine whether the supply chain has inefficiencies by determining a number of unique paths that material can flow through in the supply chain.

3. The system of claim 2, wherein the supply chain network is operable to determine whether the supply chain has inefficiencies by multiplying the number of unique paths by the number of replenishment strategies to determine a number of supply chain combinations.

4. The system of claim 3, wherein the supply chain network is operable to determine whether the supply chain has inefficiencies by determining whether the number of supply chain combinations is unequal to a target value.

5. The system of claim 1, wherein the core competencies of the nodes are tasks that can be performed at the nodes at a target level of performance.

6. The system of claim 5, wherein the supply chain network is operable to reduce the underutilization of core competencies by modifying an operation of at least one of the nodes, links, and replenishment strategies.

7. The system of claim 5, wherein the supply chain network is operable to reduce the underutilization of core competencies by removing at least one of a node, a link, and a replenishment strategy, from the supply chain.

8. A non-transitory computer readable medium, including instructions for:
identifying nodes, links connecting the nodes, and replenishment strategies for moving materials along the links, in a supply chain;
identifying tasks performed at the nodes at a target level of performance and core competencies of the nodes; and
modifying the supply chain to increase utilization of the identified tasks by increasing utilizations of the core competencies of the nodes.

9. The non-transitory computer readable medium of claim 8, wherein the instructions for modifying the supply chain include instructions for removing at least one of a node, a link, and a replenishment strategy, from the supply chain.

10. The non-transitory computer readable medium of claim 8, wherein instructions for modifying the supply chain include instructions for modifying an operation of at least one of a node, a link, and a replenishment strategy.

11. The non-transitory computer readable medium of claim 8, further including instructions for determining whether the supply chain has inefficiencies by determining a number of unique paths that material can flow through in the supply chain.

12. The non-transitory computer readable medium of claim 11, further including instructions for determining whether the supply chain has inefficiencies by multiplying the number of unique paths by the number of replenishment strategies to determine a number of supply chain combinations.

13. The non-transitory computer readable medium of claim 12, further including instructions for determining whether the supply chain has inefficiencies by determining whether the number of supply chain combinations is unequal to a target value.

14. A method for supply chain design, comprising:
identifying nodes, links connecting the nodes, and replenishment strategies for moving materials along the links, in a supply chain;
determining, with a computer, a value indicative of the complexity of the supply chain based on a characteristic of the nodes, links, and replenishment strategies;
identifying, with the computer, whether core competencies of the nodes are underutilized; and
increasing utilization of the core competencies of the nodes to reduce the complexity of the supply chain, by using the computer to modify an operation of at least one of the nodes, links, and replenishment strategies.

15. The method for supply chain design of claim 14, wherein determining a value indicative of the complexity of the supply chain includes determining a number of unique paths that material can flow through in the supply chain.

16. The method for supply chain design of claim 15, wherein determining a value indicative of the complexity of the supply chain includes multiplying the number of unique paths by the number of replenishment strategies.

17. The method for supply chain design of claim 14, wherein increasing utilization of the core competencies includes removing at least one of a node, a link, and a replenishment strategy, from the supply chain.

18. The method for supply chain design of claim 14, wherein identifying whether core competencies of the nodes are underutilized includes identifying tasks that can be performed at the nodes at a target level of performance, and determining whether the nodes are capable of performing more of the identified tasks than are currently being performed.

19. The method for supply chain design of claim 14, further including identifying whether core competencies of the nodes are underutilized only if the value indicative of the complexity of the supply chain is unequal to a target value.

\* \* \* \* \*